(12) United States Patent
Gelain

(10) Patent No.: US 6,589,345 B2
(45) Date of Patent: Jul. 8, 2003

(54) POWDER SPRAY-COATING CABIN

(75) Inventor: Silvano Gelain, Abtwill (CH)

(73) Assignee: ITW Gema AG, St. Gallen (CH)

( * ) Notice: Subject to any disclaimer, the term of this patent is extended or adjusted under 35 U.S.C. 154(b) by 25 days.

(21) Appl. No.: 09/871,675

(22) Filed: Jun. 4, 2001

(65) Prior Publication Data

US 2002/0020347 A1 Feb. 21, 2002

(30) Foreign Application Priority Data

Jun. 9, 2000 (DE) .......................................... 100 28 553

(51) Int. Cl.$^7$ ................................................ B05B 15/12
(52) U.S. Cl. ....................... 118/326; 118/308; 118/309; 118/634; 427/421; 427/478
(58) Field of Search ................................. 118/308, 326, 118/312, 313, 309, 634; 427/421–427, 478; 454/50, 53

(56) References Cited

U.S. PATENT DOCUMENTS

| | | | |
|---|---|---|---|
| 3,814,002 A | * 6/1974 | Rombach et al. | ............ 118/312 |
| 4,338,364 A | * 7/1982 | Kennon et al. | ............. 427/424 |
| 5,074,238 A | * 12/1991 | Telchuk et al. | ............. 118/326 |
| 5,690,995 A | * 11/1997 | Fischli et al. | ................ 118/309 |

FOREIGN PATENT DOCUMENTS

| | | |
|---|---|---|
| DE | 70 14 433 | 4/1970 |
| DE | 26 40 219 | 4/1977 |
| DE | 195 00 872 A1 | 7/1996 |
| DE | 196 44 360 | 4/1998 |
| DE | 198 27 877 A1 | 2/2000 |
| EP | 839 583 A | 8/1997 |
| GB | 1469945 | 4/1977 |
| WO | 99/12658 | 3/1999 |
| WO | WO 99/12658 * 3/1999 | ........... B05B/15/12 |

* cited by examiner

Primary Examiner—Richard Crispino
Assistant Examiner—Michelle Acwedo Lazor
(74) Attorney, Agent, or Firm—Lowe Hauptman Gilman & Berner, LLP

(57) ABSTRACT

A powder spray-coating cabin, in particular a vertically cylindrical cabin, has its air suction flows shifted away from the center of spray coating toward object wall passages.

21 Claims, 4 Drawing Sheets

POWDER SPRAY-COATING CABIN

BACKGROUND OF THE INVENTION

1. Field of the Invention

The invention relates to a powder spray-coating cabin. More particularly, the present invention relates to a powder spray-coating cabin fitted with two mutually opposite object wall-passages used in the transportation of objects to be coated through the cabin and with a suction channeling system configured at a lower end of an inside cabin space used to aspirate air and excess powder out of the inside cabin space.

2. Description of the Related Art

A powder spray-coating cabin of this kind is known from EP 0 839 583 A2. It may be a vertically cylindrical cabin fitted with a funnelling floor and communicating at the cabin center through a vacuum hookup with an external suction source. A similar cylindrical powder spray-coating cabin is known from DE 195 00 782 A1. In addition to the cabin floor in the form of an evacuation funnel, this latter design also includes a gutter-like floor rim along the cabin wall allowing evacuating, besides the flow from the said funnel, also air and powder particles, from the cabin. The German patent document DE 198 37 877 A1 discloses a vertically cylindrical cabin fitted with a planar floor plate. A diametrical slot runs through the floor plate allowing displacing powder particles on the floor through a rotating cleaning device.

Conventionally, spray-coating powders are fed pneumatically to spray implements, the so-called spray guns, which in turn spray these powders pneumatically and with electrostatic assistance onto the objects to be sprayed. A slight pressure deficit is maintained in the spray-coating cabins during the spray-coating process to prevent powder particles escaping from said cabin to the outside and furthermore for the purpose of evacuating excess powder (recoiling from the object or sprayed past it). Excess powder is evacuated to prevent excessively high concentrations that might entail powder-dust explosions, and also for purposes of recovery and recycling. The larger the objects to be coated, the larger also the volumetric flow of exhaust air to be removed from the inside of the cabin. This volumetric flow is generated by a suction source (blower) which is connected to the evacuation duct. The volumetric flow of exhaust air consists of the air of the pneumatically supplied powder and of the air which is aspirated through cabin apertures, in particular through the wall apertures passing the objects in the cabin wall, and of excess powder.

SUMMARY OF THE INVENTION

The objective of the invention is to increase the rate of powder spray-coating especially as regards large objects while circumventing disadvantageous flows of air or powder inside the cabin. Moreover the invention aims to improve coating quality and coating efficiency. The design of the invention shall be simple and economical and allow quickly passing to another kind of powder.

This problem is solved by the features of claim 1.

The invention offers the further substantial advantage that the cabin floor no longer need be a deep funnel and that the system of the evacuation channel below the cabin floor also may be made substantially more shallow and accordingly the cabin sub-structures no longer require an excavated pit and the powder spray-coating cabin can be erected without such a pit while the inside cabin space remains at the same height as in the state of the art.

The invention is especially advantageous when applied to vertically cylindrical cabins, though it is also appropriate for such coating cabins of which the horizontal cross-section is square or rectangular, oval or the like. The expression "vertically cylindrical" denotes that the cabin's coating space assumes the shape of a vertical cylinder. Preferably this cylinder shall be cross-sectionally circular in the horizontal, though it may also assumes other shapes such as an arcuate or polygonal contour. However corner-subtending cross-sections entail more difficulties in cleaning than do arcuate or circular ones and also may generate disadvantageous air flows.

BRIEF DESCRIPTION OF THE DRAWINGS

The invention is illustratively elucidated below by means of a preferred embodiment and in relation to the attached drawings.

DETAILED DESCRIPTION

Figure 1:
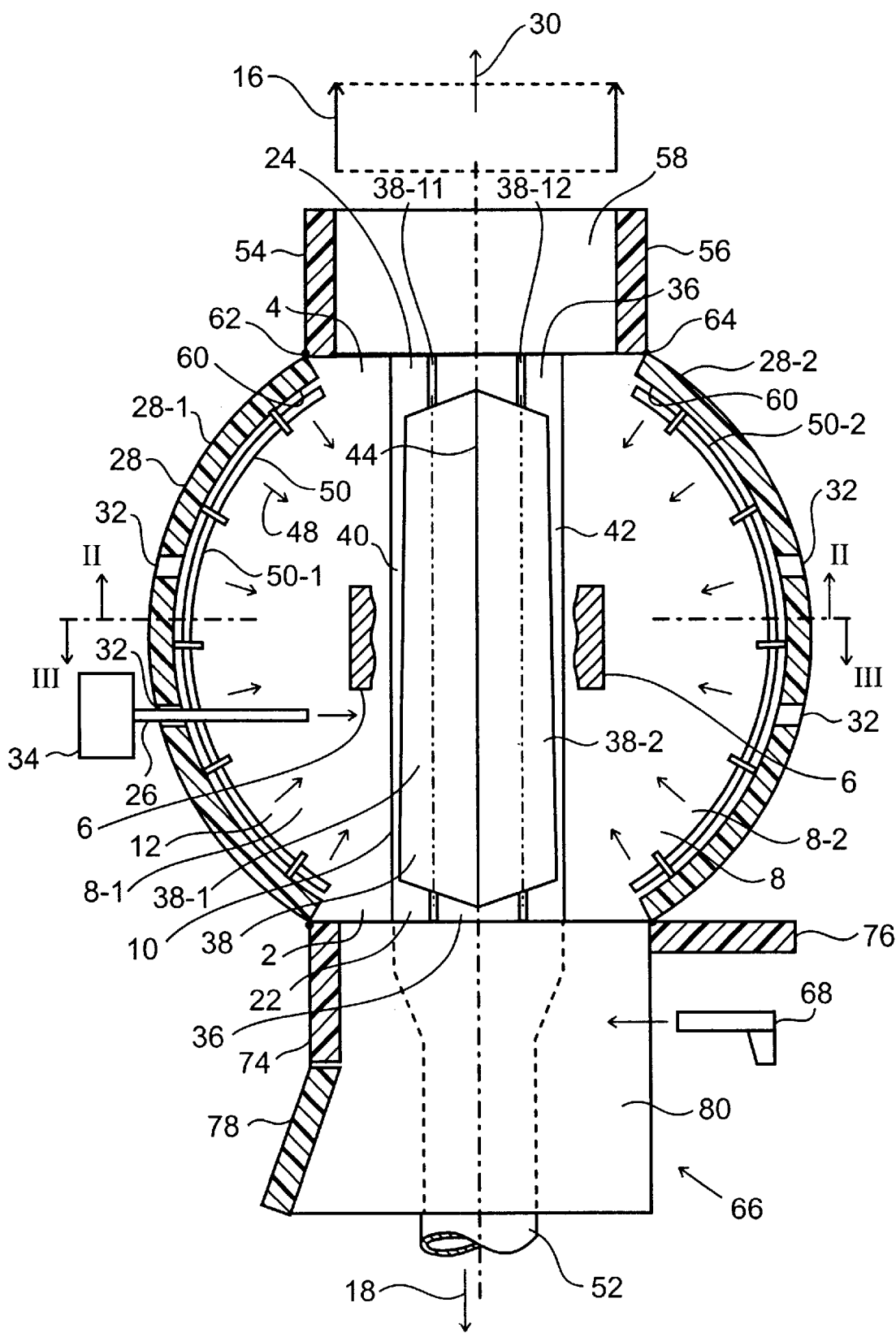
FIG. 1 is topview of a horizontal cross-section of a vertically cylindrical and circular powder spray-coating cabin of the invention.

The powder spray-coating cabin of the invention shown in the Figures contains two diametrically opposite wall passages 2 and 4 to pass and transport objects 6 to be coated through said cabin and is fitted with a cabin floor 8.

The width of the object passages 2 and 4 limits the maximal width of the object transportation path 16, that is the maximal width of the objects to be coated 6.

A suction evacuation duct 10 is mounted in the lower end of the inside cabin space 12 to evacuate air and excess powder from said space 12. The suction duct 10 is designed to entail unequal distribution of the volumetric exhaust air flow in such a way that—as seen along the transportation path 16—at least the predominant portion of, or the entire cabin exhaust air shall flow from the inside cabin space through two exhaust apertures 22 and 24 situated at the cabin end and near the object wall passages 2 and 4 resp. in the cabin floor 8 or in the cabin wall adjoining said floor 8. The volumetric exhaust flow 18 contains excess powder. This excess powder is made up of any powder recoiling from the objects to be coated 6 and of any powder sprayed by a spray device 26 past said objects. The width, height and position of the object transportation path are defined by the object wall passages 2 and 4 crossed by this path.

The cabin wall 28 preferably shall be circular in horizontal cross-section and, as seen in the direction of object advance 30, it consists of a left half wall 28-1 and a right half wall 28-2, each preferably made of a plastic, and contains at least one spray-device slot 32 through which one or more spray devices 26 point at the inside cabin space 12, aid spray device(s) 26 being supported on an actuator 34 or other support configured outside the powder spray-coating cabin, and being displaceable within the spray-device slot 32 relative to the cabin wall 28.

As seen in the direction of object advance 30, the cabin floor 8 consists of a left lateral floor zone 8-1 and of a right, lateral floor zone 8-2, further of a suction channel 36 connecting them along the cabin's transverse direction and running parallel to the direction of object advance 30 between the suction apertures 22 and 24 which it connects one to the other, and preferably of a hood or duct cover 38 covering the suction channel 36 except in the zone of the exhaust apertures 22 and 24 and except for two suction slots 40 and 42 running in the longitudinal duct direction. The duct cover 38 is part of the cabin floor. Preferably this cover assumes the geometry of a gable roof with a roof ridge line 44 running in the direction of object advance. The duct cover 38 inclusive its roof ridge line 44 may be airtight.

The width of the suction channel 36 is less than that of the object transportation path schematically shown at 16 and hence also less than the width of each of the two object wall passages 2 and 4.

Figure 2:
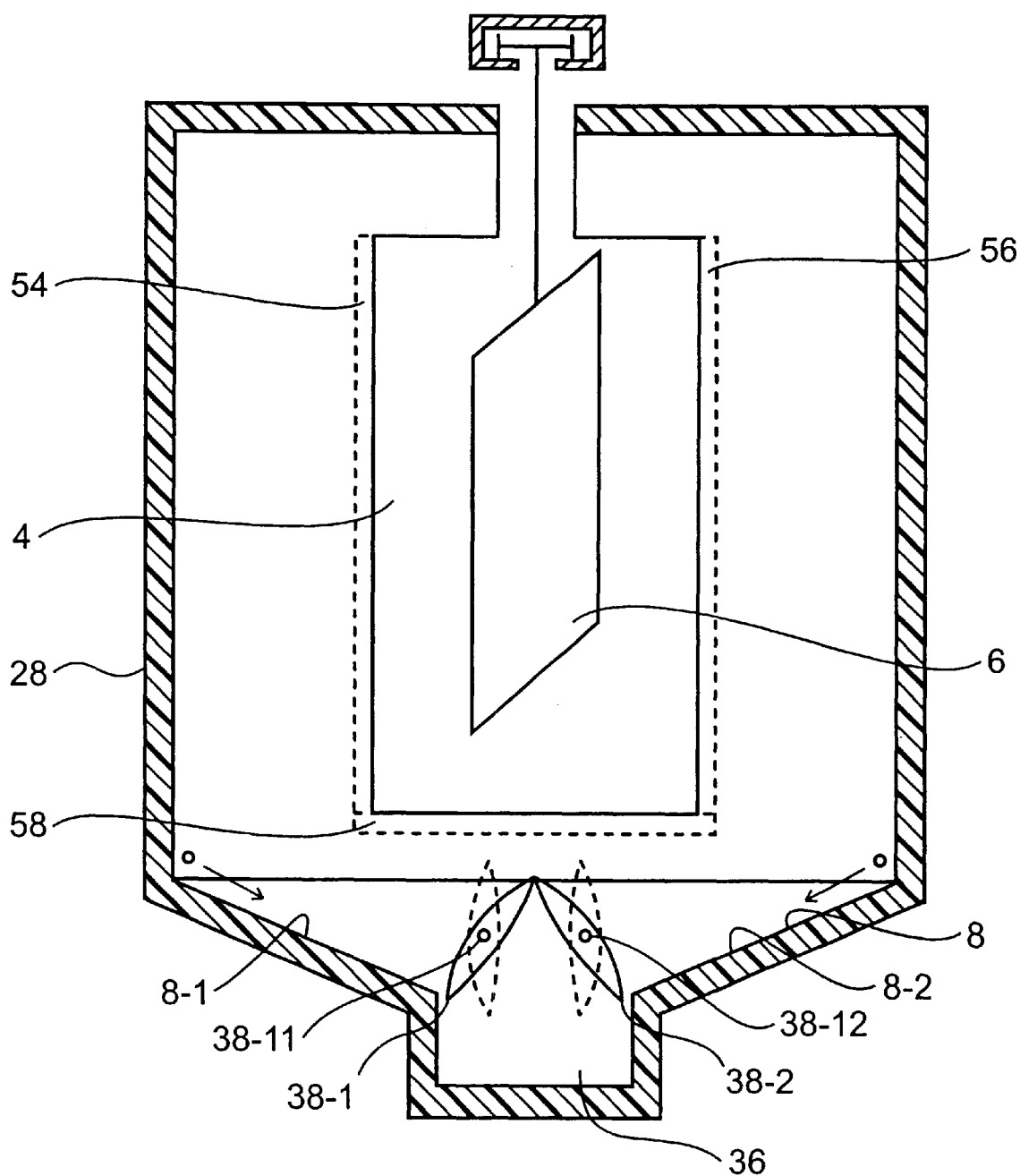
FIG. 2 is a vertical section of the powder spray-coating cabin of FIG. 1 along the plane II—II.
Figure 3:
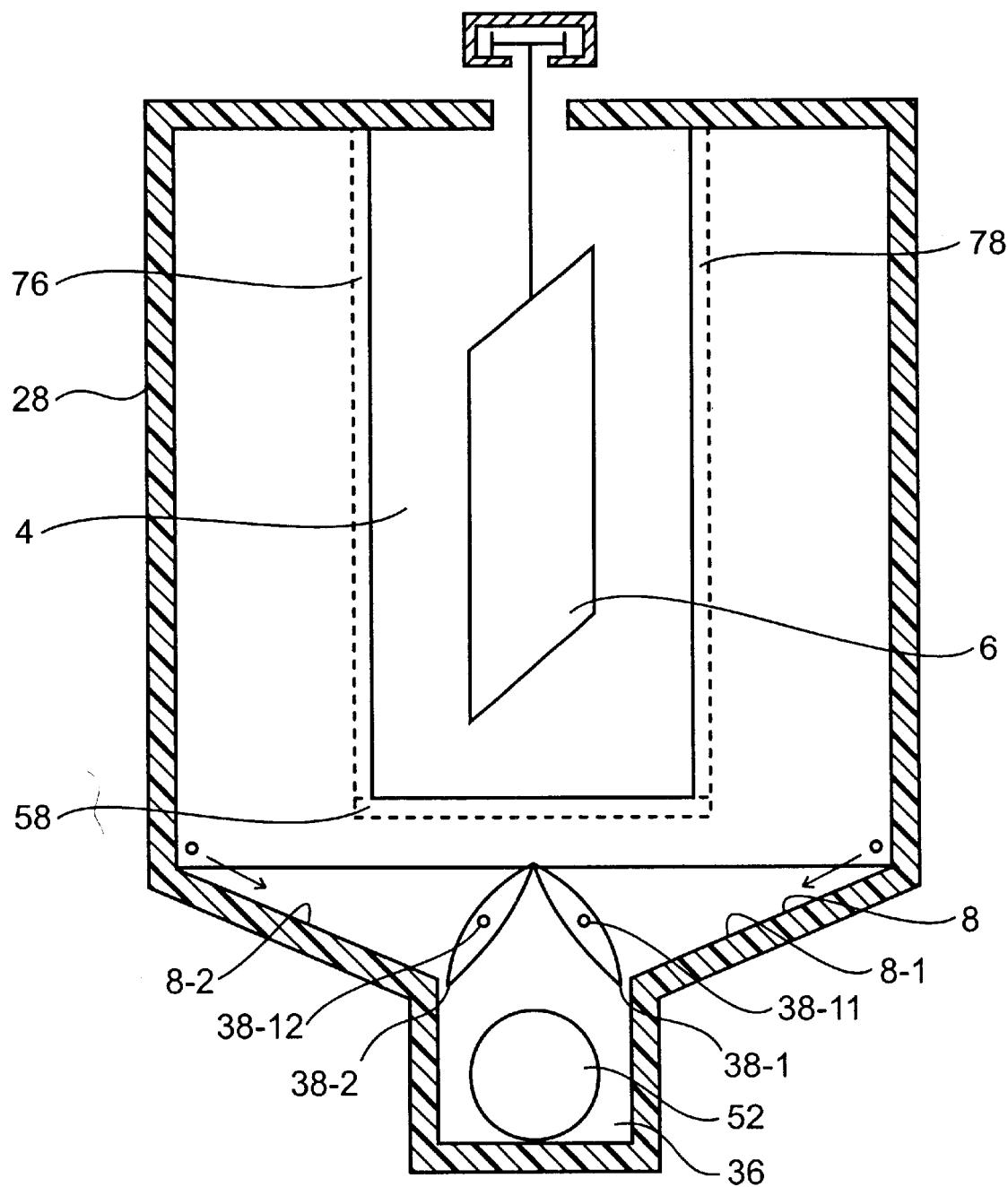
FIG. 3 is a vertical section of the powder spray-coating cabin of FIG. 1 along the plane III—III.

The two lateral floor zones 8-1 and 8-2 are configured transversely sloping like a shallow wedge toward the object transportation path 16 from the cabin wall halves 28-1 and 28-2 as far as the suction channel they subtend, as a result of which the cabin floor assumes a cross-sectional shallow wedge shape, i.e. a shallow sloping gutter, as shown in FIGS. 2 and 3, and therefore excess powder deposited on said wall halves 28-1 and 28-2 can be driven by compressed air 48 into the relatively lower suction channel 36. The compressed air 48 is applied by a compressed air manifold 50 from the zone of the cabin wall 28 past the floor zones 8-1 and 8-2 toward the suction channel 36. Jointly with further air in the cabin, the compressed air 48 is aspirated by the suction effect of an omitted suction blower through the suction apertures 22 and 24 into the suction channel 36 and from there moves through a suction hookup 52 and then through a powder separator, for instance a cyclone, separating the powder particles, and a subsequent filter, and passing through the omitted blower into the ambient.

The compressed air manifold 50 consists of a conduit segment 50-1 and 50-2 running directly on the lateral floor zone 8-1 and 8-2 or near it along the inside cabin's circumference of the left and right wall half 28-1 and 28-2, said segment extending from one object passage 2 to the other object passage 4. The line segments 50-1 and 50-2 may be spaced a few mm from the cabin wall to preclude dust particles from accumulating in between and to allow manually blowing out powder particles in said space with compressed air.

Preferably the duct cover 38 consists of two cover panels 38-1 and 38-2 each forming a "half roof" of the gabled duct cover 38 and abutting each other at the roof ridge 44. The two cover panels 38-1 and 38-2 can be rotated each about its pivot shaft 38-11 or 38-12 whether manually and/or using a motor between the shown operational position of the closed roof ridge 44 for the powder spray-coating mode, and a cleaning position wherein they are apart from the roof ridge 44 and which is schematically indicated by dashed lines in FIG. 2. In this dashed-lines cleaning position, the suction channel 36 is open at the top and as a result an operator using a compressed air tube is enabled to blow compressed air not only on the cabin wall 28 and on the cabin floor 8, but also on both sides of the cover panels 38-1 and 38-2 to remove powder particles from them and to evacuate them by the suction from the suction hookup 52 in order to clean the inside cabin space.

The flow cross-section of the two suction slots 40 and 42 together is substantially smaller than that of the two suction apertures 22 and 24 together, preferably also smaller than that of each suction aperture 22 and 24 alone.

The cross-sectional center of the suction channel 36 is aligned with the middle of the width of the object wall-passages 2 and 4. The roof ridge also preferably is aligned with the middle of the width of these object wall apertures 2 and 4.

When the cover panels 38-1 and 38-2 are in the coating mode position, the cabin zone in which the objects 6 are being coated preferably shall be wholly devoid of suction apertures. The two lateral floor zones 8-1 and 8-2 next to the suction channel 36 preferably shall also be devoid of any suction aperture. As a result the larger portion of the volumetric exhaust flow or all of said flow shall be aspirated through the two suction apertures 22 and 24 which are bounded by the two cabin ends at the object wall passages 2 and 4. As a result and compared with the state of the art, the volumetric suction flow has been shifted away from the cabin center towards the two object wall passages 2 and 4.

Embodiment Variations of the Invention

Instead of two suction slots 40 and 42, a single one may be used. This single suction slot may run at the site shown in FIG. 1 or at the center of the suction channel 36 and along its longitudinal direction. The channel cover 38 may consist of fixed elements in lieu of pivoting cover panels. The suction slots 40 and 42 may be plainly eliminated and as a result the entire cabin floor 8 shall be sealed hermetically except for the two suction apertures 22 and 24. Instead of being funnel-shaped or wedge-shaped, the two lateral floor zones 8-1 and 8-2 may also slope outward in gabled manner. In this design appropriately powder suction apertures shall be fitted into the cabin floor 8 along the cabin wall 28 or in this cabin wall. Compressed-air vent holes may be fitted on the roof ridge of such a gabled cabin floor 8 through which the compressed air may drive powder deposited on the cabin floor toward the suction apertures.

Presumably for the same reasons that water draining into a pipe, for instance of a bath tub, will generate eddies, an airflow swirling circumferentially in the cabin is generated also in a cylindrical powder spray-coating cabin having a vertical cylinder axis. Such a swirling flow entails the drawback of aspirating air into the cabin and shifting the powder particles from their ideal stream lines between the spray apparatus 28 and the object 6. To reduce such swirling, the invention provides that at least one of the two object wall-passages 2 and/or 4—namely the object exit wall passage 4 in the embodiment shown in the drawings—is designed as a conduit comprising side walls 45 and 56 projecting from the cabin outer side and a duct base 58 also projecting away from the cabin outer side, and preferably further a conduit roof. This feature precludes outside air from flowing tangentially along the cabin's inner circumferential surface 60 to enter the inside cabin space 12 through the particular object wall passage 2 or 4. According to the shown and preferred embodiment, the lateral duct walls 54 and 56 may be constituted by two substantially mutually parallel door panels 54 and 56 each affixed in pivotable manner to the cabin wall 28 so as to rotate about a vertical axis 62 and 64 resp. The two door panels 54 and 56 may be pivoted into a position sealing the object wall passage 4 for the purpose of cleaning the powder spray-coating cabin. In that case the operator may pass a compressed-air tube through the applicable, other object wall aperture 2 to blow clean the inside cabin space 12. The coating powder which is simultaneously blown off the surfaces will be aspirated simultaneously through the suction channel 36.

Moreover the same, or the other object wall passage, namely the object entry-side wall passage 2 in the shown embodiment, may be fitted with a manual coating site 66 which on the outside of the cabin abuts the object wall passage 2 and where the objects to be coated 6 may be coated using hand spray guns 68. This object wall passage 2 also can be opened and closed resp. for the spray coating mode and the cleaning mode by the two door panels 74 and 76. The door panel 74 preferably acts as the back wall of the manual coating site 66 and where called for may be extended by a stationary back wall 78. The site opposite the back wall 74, 78 is open when the hand spray gun 68 is used. Again an open manual coating site may adjoin the back wall 74, 78 in order to allow coating the objects 6 from the other side. A floor 80 of the manual coating site adjoins the outside of the cabin below the object path and between the two doors 74, 76. While spray coating takes place in the inside cabin space 12, these two door panels 74 and 76 of the object entry side wall passage 2 may be moved to be parallel to each other into the open position in order to attain the sluicing effect already described above in relation to the object wall passage 4 for the purpose of preventing tangential air inflow to the inside cabin space. It follows from this feature that the sluice conduit of the object exit-side wall passage 4 can be configured as a manual coating site or as a conduit (sluice) depending on the positions of the door panels 54 and 56 of said passage 4 in order to suppress or prevent tangential air inflow through the object wall aperture.

Figure 4:
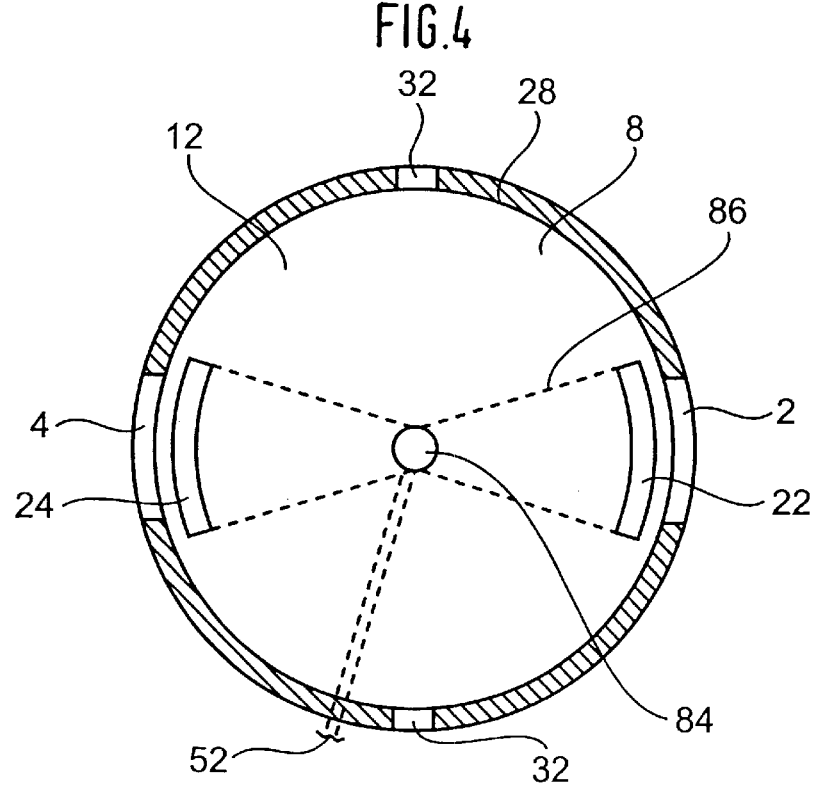
FIG. 4 is a schematic topview of another powder spray-coating cabin.

FIG. 4 is a topview of a powder spray-coating cabin of another embodiment of the invention. Seen in horizontal cross-section, said cabin assumes an inner circular contour and is fitted with a conical, downward tapering cabin floor 8 comprising a suction aperture 84 for the air and powder at the lowermost floor. A suction aperture 22 and 24 is present in the cabin floor near each of the diametrically opposite wall passages 2 and 4 resp. serving to pass objects to be coated through this cabin. Said suction apertures 22 and 24 are designed in such a way and are connected in such manner to an omitted suction source that said apertures allow evacuating more air from the inside cabin space 12 than is possible through the central suction aperture 84. In one embodiment mode the volumetric airflow of the two suction apertures 22 and 24 may exceed the volumetric airflow through the central suction aperture 84. In another embodiment mode the volumetric air flow through each of the two suction apertures 22 and 24 resp. is larger than the volumetric airflow through the central suction aperture 84. Because most of the powder not adhering to the object being coated or moving past it and dropping onto the cabin floor 8 arrives centrally on the cabin floor 8, the case may arise that more excess powder (absolutely, or as a percentage of the volumetric airflow) is aspirated through the central suction aperture 84 than at either or both suction apertures 22 and 24.

The central suction aperture 84 and the two suction apertures 22 and 24 at the cabin ends are connected to the suction hookup 52. The suction apertures 22 and 24 at the cabin ends can be connected by conduits 86 running underneath the cabin floor 8 to the suction hookup 52.

Figure 5:
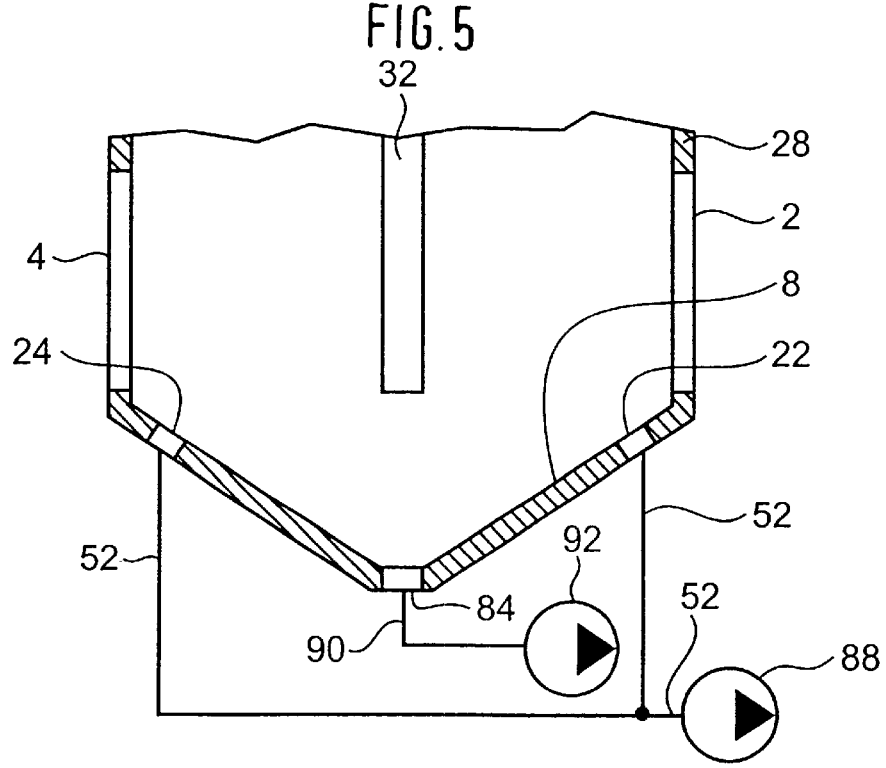
FIG. 5 is a schematic vertical section of a powder spray-coating cabin of another embodiment of the invention.

To attain improved efficiency when recovering and recycling powder, the exhaust flows of the suction apertures 22 and 24, which contain less excess powder, advantageously might be processes separately from the exhaust flow from the central suction aperture 84 containing comparatively more excess powder. For that purpose FIG. 5 shows the suction apertures 22 and 24 at the cabin ends being connected through a separate suction hookup 52 to another suction source 88 than is the central suction aperture 84 which, as shown in FIG. 5, is connected through a second suction hookup 90 to another suction source 92. The suction sources 88 and 92 may be in the form of separate suction conduits of a filter system or cyclone system to separate powder particles from the suction air flow and may be connected to separate blowers or to a common one. In other embodiment modes, instead of or additionally to the central suction aperture 84, other suction apertures may be used, for instance at the suction slots 40 and 42 or at another site in the cabin floor at the center line or on both sides of the object transport path through the cabin.

Corresponding parts are denoted by the same references in all drawings.

What is claimed is:

1. A powder spray-coating cabin fitted with two mutually opposite object wall-passages used in the transportation of objects to be coated through the cabin and with a suction channeling system configured at a lower end of an inside cabin space used to aspirate air and excess powder out of the inside cabin space, the cabin comprising:

the suction channeling system being configured at the lower end of the inside cabin space to attain unequal distribution of a volumetric exhaust flow in such a way that as seen along the object transportation path, at least a major portion of said volumetric exhaust flow flows out of the inside cabin space through suction apertures at an end of the cabin and near the object wall-passages in the inside cabin space; and at least one of the two object wall passages being in the form of a channel comprising channel side walls projecting away from the object transportation paths and comprising a duct base projecting away from outside of the cabin.

2. A powder spray-coating cabin as claimed in claim 1, further comprising said suction apertures at the cabin's end being connected to a common suction hookup to implement flow.

3. A powder spray-coating cabin as claimed in claim 1, further comprising a suction channel which is part of the suction channeling system being fitted into a cabin floor and a hood laterally spaced from said cabin floor and running above said suction channel.

4. A powder spray-coating as claimed in claim 1, further comprising a cabin floor which at least on both sides of the object transportation path is devoid of suction apertures.

5. A powder spray-coating cabin as claimed in claim 1, further comprising a cabin floor which is configured on both sides of the object transportation path from a cabin wall transversely to said path in a down-sloping wedge shape as far as a floor zone situated underneath said path, and a trough of the wedge shape which runs along the object transportation path and is fitted with at least one suction slot, which is a part of the suction channeling system, in the cabin floor, which also runs along the object transportation path.

6. A powder spray-coating cabin as claimed in claim 5, further comprising a minimum of one suction slot issuing into a suction channel running underneath it and along the object transportation path while connecting the two suction apertures at the cabin end, said at least one suction slot being narrower than the suction channel.

7. A powder spray-coating cabin as claimed in claim 6, further comprising a minimum of one suction slot issuing at its longitudinal ends into the suction apertures at the cabin's end.

8. A powder spray-coating cabin as claimed in claim 6, further comprising a panel-like cabin floor zone acting as a hood covering the suction channel and running along and underneath the object transportation path and configured to pivot about a pivot shaft situated along said path, said hood being rotatable about said shaft between a coating mode position covering said suction channel when the powder coating mode applies and a cleaning position clearing said channel when the cleaning mode applies.

9. A powder spray-coating cabin as claimed in claim 8, further comprising a minimum of one zone suction slot in the coating mode position of the panel-type, and rotatable floor zones being bounded by a longitudinal edge of said zone and by a longitudinal edge, opposite the first said edge, of a stationary cabin floor zone.

10. A powder spray-coating cabin as claimed in claim 6, further comprising two of said suction slots being configured alongside each other at a spacing between them.

11. A powder spray-coating cabin as claimed in claim 10, further comprising two panel-like cabin floor segments being mounted parallel to each other and subtending a roof, and their mutually far away longitudinal edges each bounding one of the suction slots.

12. A powder spray-coating cabin as claimed in claim 11, further comprising mutually adjacent longitudinal edges of the two cabin floor segments resting against each other in the coating mode position and jointly subtending a closed floor surface but disposed mutually transversely apart in the cleaning mode position to allow blowing compressed cleaning air between the space so subtended between them.

13. A powder spray-coating cabin as claimed in claim 1, further comprising the cabin being vertically cylindrical and at least the inside cabin space being a vertical cylinder.

14. A powder spray-coating cabin as claimed in claim 1, further comprising several suction hookups to separately aspirate air out of the inside cabin space on one hand through the suction apertures at the cabin end and on the other hand through at least one suction aperture which is configured at a site collecting more excess coating powder than at either of the two suction apertures.

15. A powder spray-coating cabin fitted with two mutually opposite object wall-passages used in the transportation of objects to be coated through the cabin and with a suction channeling system configured at a lower end of an inside cabin space used to aspirate air and excess powder out of the inside cabin space, the cabin comprising:

the suction channeling system being configured at the lower end of the inside cabin space to attain unequal distribution of a volumetric exhaust flow in such a way that as seen along the object transportation path, at least a major portion of said volumetric exhaust flow shall flow out of the inside cabin space through suction apertures at an end of the cabin and near the object wall-passages in the inside cabin space; and a cabin floor that is configured on both sides of the object transportation path from a cabin wall transversely to said path in a down-sloping wedge shape as far as a floor zone situated underneath said path, and a trough of the wedge shape that runs along the object transportation path and is fitted with at least one suction slot which is a part of the suction channeling system, in the cabin floor, which also runs along the object transportation path; and a minimum of one suction slot issuing into a suction channel running underneath it and along the object transportation path while connecting the two suction apertures at the cabin end, said at least one suction slot being narrow than the suction channel; and a panel-like cabin floor zone acting as a hood covering the suction channel and running along and underneath the object transportation path and being configured to pivot about a pivot shaft situated along said path, said hood being rotatable about said shaft between a coating mode position covering said suction channel when the powder coating mode applies and a cleaning position clearings said channel when the cleaning mode applies.

16. A powder spray-coating cabin as claimed in claim 15, further comprising a minimum of one suction slot issuing at its longitudinal ends into the suction apertures at the cabin's end.

17. A powder spray-coating cabin as claimed in claim 15, further comprising a minimum of zone suction slot in the coating mode position of the panel-type, and rotatable floor zones being bounded by a longitudinal edge of said zone and by a longitudinal edge, opposite the first said edge, of a stationary cabin floor zone.

18. A powder spray-coating cabin as claimed in claim 15, further comprising two of said suction slots being configured alongside each other at a spacing between them.

19. A powder spray-coating cabin as claimed in claim 18, further comprising two panel-like cabin floor segments being mounted parallel to each other and subtend a roof, and their mutually far away longitudinal edges each bounding one of the suction slots.

20. A powder spray-coating cabin as claimed in claim 19, further comprising mutually adjacent longitudinal edges of the two cabin floor segments resting against each other in the coating mode position and jointly subtending a closed floor surface but being mutually transversely apart in the cleaning mode position to allow blowing compressed cleaning air between the space so subtended between them.

21. A powder spray-coating cabin fitted with two mutually opposite object wall-passages used in the transportation of objects to be coated through the cabin and with a suction channeling system configured at a lower end of an inside cabin space used to aspirate air and excess powder out of the inside cabin space, the cabin comprising:

the suction channeling system being configured at the lower end of the inside cabin space to attain unequal distribution of a volumetric exhaust flow in such a way that as seen along the object transportation path, at least a major portion of said volumetric exhaust flow flows out of the inside cabin space through suction apertures at an end of the cabin and near the object wall-passages in the inside cabin space; and a cabin floor which is configured on both sides of the object transportation path from a cabin wall transversely to said path in a down-sloping wedge shape as far as a floor zone situated underneath said path, and a trough of the wedge shape which runs along the object transportation path and is fitted with at least one suction slot which is a part of the suction channeling system, in the cabin floor, which also runs along the object transportation path; and a minimum of one suction slot issuing into a suction channel running underneath it and along the object transportation path while connecting the two suction apertures at the cabin end, said at least one suction slot being narrow than the suction channel; and two of said suction slots being configured alongside each other at a spacing between them; and two panel-like cabin floor segments that are mounted parallel to each other and subtending a roof, and their mutually faraway longitudinal edges each bounding one of the suction slots; and mutually adjacent longitudinal edges of the two cabin floor segments resting against each other in the coating mode position and jointly subtending a closed floor surface but being mutually transversely apart in the cleaning mode position to allow blowing compressed cleaning air between the space so subtended between them.

* * * * *